United States Patent [19]

Erdmannsdoerfer et al.

[11] Patent Number: 4,670,233

[45] Date of Patent: Jun. 2, 1987

[54] METHOD OF REMOVING SOOT WHICH HAS BEEN TRAPPED IN AN EXHAUST GAS FILTER OF AN INTERNAL COMBUSTION ENGINE

[75] Inventors: Hans Erdmannsdoerfer, Ludwigsburg; Rudi Numrich, Weinstadt; Manfred Wagner, Stuttgart; Gerd Weyh, Leonberg-Eltingen, all of Fed. Rep. of Germany

[73] Assignee: Filterwerk Mann & Hummel GmbH, Ludwigsburg, Fed. Rep. of Germany

[21] Appl. No.: 783,871

[22] Filed: Oct. 3, 1985

[30] Foreign Application Priority Data

Oct. 4, 1984 [DE] Fed. Rep. of Germany ....... 3436351

[51] Int. Cl.$^4$ ................................................ B01J 8/02

[52] U.S. Cl. .................................... 423/213.2; 55/96; 55/DIG. 30; 60/295; 60/311

[58] Field of Search ........... 55/96, 523, 466, DIG. 30; 60/311, 310, 214, 295; 423/213.2, 213.5, 213.7; 502/225, 224, 25, 27, 23

[56] References Cited

U.S. PATENT DOCUMENTS

| | | | |
|---|---|---|---|
| 2,031,475 | 2/1936 | Frazer | 423/213.2 |
| 2,946,325 | 7/1960 | Gentile | 60/295 |
| 3,738,085 | 6/1973 | Nishinomiya | 60/311 |
| 4,324,572 | 4/1982 | Erdmannsdorfer et al. | |
| 4,335,574 | 6/1982 | Sato et al. | 55/466 |
| 4,436,535 | 3/1984 | Erdmannsdorfer | 55/96 |
| 4,462,208 | 7/1984 | Hicks | 60/286 |
| 4,516,990 | 5/1985 | Erdmannsdorfer | 55/96 |

FOREIGN PATENT DOCUMENTS

| | | | |
|---|---|---|---|
| 725371 | 1/1966 | Canada | 60/295 |
| 3024539 | 4/1982 | Fed. Rep. of Germany | |
| 2080140 | 2/1982 | United Kingdom | |

*Primary Examiner*—Bernard Nozick

*Attorney, Agent, or Firm*—Karl F. Ross; Herbert Dubno

[57] ABSTRACT

The invention relates to a means and a method for removing soot in an exhaust gas filter of an internal combustion engine, more especially a diesel engine, by reducing the ignition temperature during the operation of the internal combustion engine. For this purpose, the ignition is brought about by the addition of at least one oxidizing agent. A plurality of particles of at least one combustible substance may also be caused to flow or burn, and the particles may be passed through the exhaust gas stream to the filter, so that the soot layer is ignited.

16 Claims, No Drawings

METHOD OF REMOVING SOOT WHICH HAS BEEN TRAPPED IN AN EXHAUST GAS FILTER OF AN INTERNAL COMBUSTION ENGINE

FIELD OF THE INVENTION

The invention relates to a method of removing soot which has been trapped in an exhaust gas filter of an internal combustion engine.

BACKGROUND OF THE INVENTION

Internal combustion engines, more especially diesel engines, produce considerable quantities of soot, especially when they are under load. This is particularly noticeable with motor vehicles. For this reason, various attempts have already been made to filter out the soot from the exhaust gas and to regenerate the filter by burning the soot. This burning process may be effected during the running of a diesel engine, since it is driven with an excess amount of oxygen, so that there is always sufficient oxygen still available in the exhaust gas for the burning process. Under particular operating conditions, it is also possible for the temperature of the exhaust gas to be so high that the burning of a layer of soot on the filter is automatically induced before the filter becomes congested. Such operating conditions are, however, often undesirable and are also dependent on chance.

As a consquence thereof, there has been a tendency to induce the burning of the layer of soot on the exhaust gas filter on purpose, especially when the flow resistance of the filter has risen to a predetermined level. In particular, reference is made to German patent publication No. 30 07 642 where such a filter is described; German patent publication No. 30 24 539 which is concerned with inducing burning by means of microwaves; and German patent publication No. 31 11 228 which discloses how to reduce the ignition temperature by using copper (I) chloride as a soot remover having catalytic properties. In addition, in U.K. Patent Application No. 2145349A which is not a prior publication, it is proposed to add ammonium nitrate as well as copper (I) chloride to the soot which has been trapped on the filter, so that the temperature for inducing the burning process can be reduced even further, i.e. to an exhaust gas temperature of approximately 280° C. However, even this temperature is often still too high. It was also apparent that copper (I) chloride, which is precipitated as copper oxide on the fibrous filter, may result in a reduced permeability of the filter after a relatively long period of operation.

OBJECT OF THE INVENTION

The object of the invention is to permit the burning of the filter to be commenced in a positive and simple manner without detrimentally affecting the filter itself as a result thereof.

SUMMARY OF THE INVENTION

This object is achieved, in that the ignition is brought about by the addition of at least one oxidizing agent and/or a plurality of particles of at least one combustible substance is caused to glow or burn, and the particles are passed with the exhaust gas stream to the filter.

The method according to the invention is such that conditions are provided which induce the soot on the filter to be ignited at several locations or at a plurality of individual locations, from which the combustion front continues to expand, due to the oxygen in the normal exhaust gas stream, until it has substantially burned the entire filter clean. This means that it is no longer necessary to heat the exhaust gas stream or the entire filter housing generally until the ignition temperature is reached. Instead, numerous burning locations are produced on the filter itself, or respectively burning nuclei which have already been produced are implanted in the layer of soot on the filter and they then expand over said filter. This constitutes an essential difference from a method which is disclosed in German patent publication No. 28 15 365, wherein a combustible gas, which has been introduced into a combustion chamber, is periodically heated, and the exhaust gas is heated until the ignition temperature is reached.

It is preferable for so many burning nuclei or burning locations to be produced that, when viewed statistically, there are 1 to 500, more especially 5 to 100, burning nuclei per $dm^2$ of the filter surface. Even if some of them become extinguished, the number is still sufficiently large to induce burning of the filter. The burning nuclei or burning locations may be provided in a pointwise or even a real manner, depending on whether the additives are finely distributed or whether they are put on the filter in suitably larger portions.

The burning nuclei are more especially produced, in that the oxidizing agent as such appears on the soot surface of the filter and induces burning of the soot at the points of impact. However, combustible substances which are suspended in the exhaust gas and are possibly metered may also be ignited by means of the oxidizing agent before they reach the filter, and then they meet the soot surface in their burning state. By way of contrast, ammonium nitrate of the older, non-published application cannot be regarded as an oxidizing agent in this sense.

The oxidizing agents, more especially all of the additives which are used in accordance with the invention, are preferably those which produce residue-free, i.e. exclusively volatile, combustion products. The oxidizing agent and the combustible substance are preferably added simultaneously and, in particular, jointly, i.e. mixed together. The addition is preferably effected in a finely distributed manner. In addition, the turbulence of the exhaust gas in the filter housing promotes a good distribution of the burning locations along the filter. The filter is preferably a wound, tubular fibrous filter of known type. Metering of the oxidizing agent and/or the combustible substance may be adjusted to the filter, or filters, so that, if desirable, the rate at which the individual particles meet the filter surface within a predetermined period can be increased. A fine distribution of oxidizing agent and/or combustible substance may be effected by means of pressure spraying with or without additional air. It is particularly advantageous to add the combustible substance and, more especially, the oxidizing agent in the presence of water. For this purpose, the substances may be dispersed in water and preferably dissolved. Oxidizing agents which are soluble in water or combustible substances are used particularly advantageously as a consequence thereof. Metering in water is simple. The same applies to storing the additives in an aqueous medium. In such case, the concentrations of the substances which are dissolved in water may be adjusted so that both the freezing point and the boiling point of the solutions lie outside the temperature ranges which normally occur.

In one embodiment of the invention, soot particles which are suspended in the exhaust gas before they reach the filter are ignited by the addition of the oxidizing agent and serve for their part, therefore, as burning nuclei. This process may be conducted in addition to the purposeful combustion of added, combustible substances by means of the oxidizing agent. In particular, the oxidizing agents are those which, at the prescribed temperatures, have a greater oxidizing effect than oxygen.

Various types of oxidizing agents may be used, but liquid oxidizing agents or those soluble in water are preferred. Those which are particularly suitable are per compounds, such as hydrogen peroxide, and, in particular, per acids, perchloric acid and its compounds being again preferable. Mixed with perchloric acid, perchlorates are particularly suitable of those metals which have catalytic properties upon combustion of the soot layer, more especially those perchlorates of copper. In such a case, copper which may also be added in the form of another compound is metered in such an amount that the consumption of copper already contained in the filter is compensated-for, i.e. there is no surplus metering. It has indeed been found that the copper compounds primarily have a favorable effect on the combustion of the soot after ignition has been effected, and that the ignition may be achieved by means of the oxidizing agent and/or the burning or glowing muclei.

The combustible substance is preferably of an organic type. It was apparent that liquid organic compounds and solid organic compounds which are, in particular soluble in water are suitable, more especially monovalent or polyvalent alcohols, ketones, hydroxy alcohols, monovalent or polyvalent carboxylic acids, as well as hydroxy carboxylic acids, all having 3 to 15 carbon atoms, but especially 3 to 10 carbon atoms. Solid, combustible, organic substances are particularly preferred, since they decompose upon heating and form solid products. This group of substances includes, inter alia, carbohydrates, more especially sugars, and in turn those which are preferred are the ones which have good solubility in water.

By using such substances in an aqueous solution, perchloric acid and, possibly, perchlorates and the combustile substance may be safely used in the form of a common solution and be easy to handle.

The oxidizing agent and the combustible substance may be used in stoichiometrical amounts. The operation may also be carried out with an excess amount of oxidizing agent, such excess being up to 100%.

When perchloric acid and raw sugar are added together, particularly good results are achieved, especially when the operation is carried out with 1 to 4 mols, but preferably 2 to 3 mols, of perchloric acid per mol of sugar.

The total amount of oxidizing agent used depends primarily on the surface of the filter, i.e. generally on the number and size of the filter cartridges, and may vary within a wide range. Normally, quantities of from 0.1 g to 1 g of oxidizing agent per 100 cm2 filter surface are sufficient for the ignition of the combustion process. Particularly good results are achieved when the oxidizing agent, the combustible substance, the catalyst, more especially a copper compound, and a chlorine compound co-exist jointly.

This is the reason why it is preferable for at least one additive, more especially the oxidizing agent and/or the copper compound, to be a chlorine compound which is advantageously at least partially volatile.

If the operation is carried out in an aqueous solution, the concentration depends mainly on the operability and thermal stability of the mixture. If perchloric acid is used as the oxidizing agent, then said acid in the metering solution is generally in a concentration of from 20% by weight to approximately 70% by weight, but more especially from 40% by weight to 70% by weight.

Moreover, the invention relates to a means and use thereof for inducing combustion of soot on an exhaust gas filter.

SPECIFIC EXAMPLES

The present invention will be further illustrated with reference to the following non-limitative Examples.

EXAMPLE 1

A filter housing having twelve tubular low-pass filters formed of mineral fibres is located in the exhaust gas system of a 70 H.E. diesel engine, such filters being traversed by the exhaust gas of the engine. The filters have a deposit of copper oxide on their respective surfaces.

An aqueous solution of 60% by weight of perchloric acid is contained in a storage container. After the engine has been running for approximately one to two hours, the flow resistance of the filter is increased to a predetermined value of 150 mbar by the deposition of soot. Subsequently, approximately 20 ml of the perchloric acid solution are sprayed under pressure, by means of a plurality of nozzles, into the filter housing in the direction of the filter cartridges. There, glowing pockets are formed at numerous locations, such pockets expanding within a few seconds and causing the filter to burn clean. Tests have shown that, at exhaust gas temperatures of approximately 200° C., a reliable start to combustion is achieved.

EXAMPLE 2

Example 1 is repeated, but, instead of using the pure perchloric acid solution, a solution of 1 part by weight of perchloric acid (60%) and 1 part by weight of raw sugar (40%) is used. In such a case, the solution is diluted to such an extent that the concentration of perchloric acid is approximately 25% by weight. In addition, the solution also contains 5% by weight of copper perchlorate. After the solution has been sprayed-in, a considerable shower of sparks is produced, which is deposited on the soot layer of the filter by the stream of exhaust gas and which produces numerous burning locations in a substantially uniform distribution. Even after numerous repetitions of the cycle, the ignition and combustion of the soot layer are reliably effected.

EXAMPLE 3

The structural arrangement and operation are identical to those of Example 2, but glycerine is used instead of raw sugar with the same percentage by weight. In this case also, reliable ignition and burning of the deposited soot layer are effected.

EXAMPLE 4

While repeating Example 1, 20 ml of an aqueous solution of 50% by weight of copper perchlorate are introduced, instead of the solution of pure perchloric acid. At many locations on the surface of the filter cartridges which are coated with soot, there is a distinct ignition effect which results in the soot layer being positively burned off.

EXAMPLE 5

Using the engine and exhaust gas filtering apparatus of Example 1, and after the predetermined flow resistance of the filter cartridges of 150 mbar has been reached, approximately 20 ml of an aqueous solution of 40% by weight of sugar, together with approximately 5 ml of an aqueous solution of 30% by weight of copper (II) chloride, are injected into the housing of the exhaust gas filter upstream of the filter cartridges. Initially, no reaction whatsoever is apparent.

After a few seconds have elapsed, during which period the injected water component evaporates, approximately 20 ml of an aqueous solution of 60% by weight of hydrogen peroxide are sprayed into the filter housing through nozzles. Numerous glowing pockets are immediately produced on the filter cartridges, and the layer of soot burns away.

What we claim is:

1. A method of removing soot trapped upon an internal combustion engine exhaust filter, comprising the steps of:
   - (a) initiating ignition at a multiplicity of sites on the soot trapped in said filter by introducing a peracid oxidizing agent selected from the group which consists of peracids and salts thereof into said filter so that the introduced peracid oxidizing agent is dispersed to said sites, and inducing oxidation of material by said peracid oxidizing agent; and
   - (b) burning the soot following the ignition initiated at least in part by said peracid oxidizing agent.

2. The method defined in claim 1 wherein said peracid oxidizing agent is distributed in said filter in finely divided form.

3. The method defined in claim 1 wherein the ignition is step (a) is at least in part induced by causing particles of soot in the exhaust gas passing through said filter to glow by oxidation with the peracid oxidizing agent and then depositing the glowing soot particles on the filter.

4. The method defined in claim 1 wherein said peracid oxidizing agent is distributed in said filter in the form of an aqueous solution thereof.

5. The method defined in claim 1, further comprising the step of introducing into said filter concurrently with the introduction of said peracid oxidizing agent thereto, at least one combustible substance which is distributed onto said filter and is ignited by said peracid oxidizing agent to at least glow and create sites of incipient combustion on said filter.

6. The method defined in claim 1 or 5 wherein the introduction is effected directly in a housing for said filter.

7. The method defined in claim 1 or 5 wherein the introduction is effected into the exhaust gas flowing toward said filter and in the direction thereof.

8. The method defined in claim 1 or claim 5 wherein said peracid oxidizing agent is selected from the group which consists of perchloric acid and copper perchlorate.

9. The method defined in claim 1 or 5 which comprises providing a soot-combustion-promoting catalyst on said filter independently of said peracid oxidizing agent.

10. The method defined in claim 5 wherein said combustible substance is distributed in said filter in finely divided form.

11. The method defined in claim 5 wherein said combustible substance is so introduced into said filter that particles thereof are ignited before they reach said filter.

12. The method defined in claim 5 wherein said combustible substance is distributed in said filter in the form of an aqueous solution thereof.

13. The method defined in claim 5 wherein said combustible substance is a solid organic compound which does not evaporate at the temperature of the exhaust gas.

14. The method defined in claim 13 wherein said combustible substance is a solid organic compound which does not evaporate at the combustion temperature of the soot in said filter.

15. The method defined in claim 14 wherein said combustible substance is a carbohydrate.

16. The method defined in claim 15 wherein said combustible substance is sugar.

* * * * *